United States Patent [19]

Kanzawa

[11] Patent Number: 5,535,262
[45] Date of Patent: Jul. 9, 1996

[54] ELECTRONIC PRIVATE EXCHANGE SYSTEM HAVING TALKING RECORDING FUNCTION

[75] Inventor: Sinichi Kanzawa, Tokyo, Japan

[73] Assignee: Kabushiki Kaisha Toshiba, Kawasaki, Japan

[21] Appl. No.: 239,545

[22] Filed: May 9, 1994

[30] Foreign Application Priority Data

May 10, 1993 [JP] Japan ..................................... 5-108423

[51] Int. Cl.$^6$ .................................................. H04M 1/64
[52] U.S. Cl. .............................. 379/67; 379/84; 379/157; 379/198; 379/201
[58] Field of Search .................................. 379/67, 88, 89, 379/214, 198, 156, 157, 84, 201

[56] References Cited

U.S. PATENT DOCUMENTS

| | | | |
|---|---|---|---|
| 4,602,129 | 7/1986 | Matthews et al. | 379/88 |
| 4,969,136 | 11/1990 | Chamberlin et al. | 379/84 |
| 5,249,217 | 9/1993 | Lee | 379/88 |
| 5,355,403 | 10/1994 | Richardson et al. | 379/88 |

FOREIGN PATENT DOCUMENTS

62-266956   11/1987   Japan .

Primary Examiner—Jeffery Hofsass
Assistant Examiner—Fan Tsang
Attorney, Agent, or Firm—Finnegan, Henderson, Farabow, Garrett & Dunner

[57] ABSTRACT

An electronic private branch exchange system with a message recording function comprises a private branch exchange with at least one office line and a plurality of extensions for selectively switching between the office line and the extensions and between the extensions, extension telephones connected to the extensions, and a recording unit for recording and reproducing speech transmitted and received by the extension telephones, wherein each of the extension telephones includes request input means for inputting desired requests including requests for recording and reproducing speech related to its own call, and request informing means for informing the electronic private branch exchange of the contents of the request inputted from the request input means, and the electronic private branch exchange includes recording management control means for providing control of the recording unit according to the contents of the request, the control including the recording and reproducing of the contents of speech, when the request is informed by at least one of the extension telephones.

32 Claims, 7 Drawing Sheets

RECORDING REQUEST FLAG | RECORDING FINISH FLAG

| | | |
|---|---|---|
| 4000 | 1 | 0 |
| 4001 | 0 | 1 |
| 4002 | 0 | 1 |
| ⋮ | | |
| 4099 | 1 | 0 |
| | M11 | M12 |

FIG. 4

RECORDING TIMER TABLE

| | |
|---|---|
| 4000 | 27 |
| 4001 | 0 |
| 4002 | 0 |
| ⋮ | ⋮ |
| 4099 | 0 |
| | M2 |

FIG. 5

| BASIC RECORDING TIME | EXTRA RECORDING TIME |
|---|---|
| T1 | T2 |
| M31 | M32 |

FIG. 6

| EXTENSION TEL. NO. | START ADDRESS | END ADDRESS |
|---|---|---|
| 0 | 0 | 0 |
| 4005 | 000800 | 002345 |
| 4001 | 003106 | 006111 |
| ⋮ | ⋮ | ⋮ |
| 4051 | 000000 | 0007FF |
| 4022 | 002346 | 002555 |

FIG. 7A

| Address | Content |
|---|---|
| 000000 | SPEECH AT 4051 |
| 0007FF | |
| 000800 | SPEECH AT 4005 |
| 002345 | |
| 002346 | SPEECH AT 4022 |
| 002555 | |
| 002556 | |
| 003105 | |
| 003106 | SPEECH AT 4001 |
| 006111 | |
| 006112 | ⋮ |
| FF0000 | |
| FF0805 | |

ELECTRONIC PRIVATE EXCHANGE SYSTEM HAVING TALKING RECORDING FUNCTION

BACKGROUND OF THE INVENTION

1. Field of the Invention

This invention relates to an electronic private branch exchange system with the function of recording conversation over an extension telephone, which is installed in an office, a business building, a school, or the like.

2. Description of the Related Art

Recently, various service functions have been available with an electronic private branch exchange system. One of them is a message recording function such as voice mail. The recording function is realized by, for example, incorporating a recorder in an electronic private branch exchange or adding the former to the latter to record conversation over an extension telephone on the recorder. One typical use of the massage recording function is, for example, a telephone answering machine which records the message from the caller when the called extension telephone has not answered.

For another use of the message recording function, a method has recently been considered where conversation over the called extension is recorded on a recorder when the called extension telephone has answered, and the talk recorded on the recorder is reproduced as the need arises after the call has finished. With this method, the contents of the talk can be analyzed or confirmed. This use makes it possible to reconfirm the calling party's name, company name, the contents of the important message, etc. after the call has finished, which is very convenient.

To realize the use, the user of a conventional extension telephone operates particular keys including function keys after having made a terminating call response, in order to instruct a private branch exchange to record. Receiving the recording instruction, the private branch exchange actuates a recorder to record conversation over the extension telephone. Because the user operates to specify a recording operation as the occasion demands while talking, he may fail to record the important message from the other party while operating to specify recording or may be unable to record the other party's name and company name given immediately after the terminating call response.

To solve the problem, a system has been proposed which provides a "Message Recording" class for subscribers to an ISDN or the like, and causes a three-party talk connecting function and a message recorder to record conversation automatically (Jpn. Pat. Appln. KOKAI Publication No. 62-266956). Since the system previously allocates "Message Recording" class to the subscribers who need message recording, all subscribers (or the users of extension telephones in the electronic private branch exchange) cannot use the message recording function equally. Additionally, the procedure for changing subscribers (or users of extension telephones) who need message recording is troublesome. Furthermore, because a conventional system records all the calls the subscribers made, none of the subscribers (or the users of the extension telephones) can record talks as the need arises.

SUMMARY OF THE INVENTION

The object of the present invention is to provide an electronic private branch exchange system with a message recording function which can not only record all of the contents of conversation over an extension telephone immediately after the terminating call response or the call originating, but also can record, reproduce, or erase the conversation easily.

The foregoing object is accomplished by providing an electronic private branch exchange system with a message recording function comprising: a private branch exchange with at least one office line and a plurality of extensions for selectively switching between the office line and the extensions and between the extensions; extension telephones connected to the extensions; and a recording unit for recording and reproducing speech transmitted and received by the extension telephones. Each of the extension telephones includes: request input means for inputting desired requests including requests for recording and reproducing speech related to its own call; and request informing means for informing the electronic private branch exchange of the contents of the request inputted from the request input means. The electronic private branch exchange includes: recording management control means for providing control of the recording unit according to the contents of the request, the control including the recording and reproducing of the contents of speech, when the request is informed by at least one of the extension telephones.

The electronic private branch exchange includes recording means for recording extension numbers and the start and end addresses of the contents of speech on the recording unit. The recording means includes means for recording the start time of speech on the recording unit.

The request input means includes means for inputting a desired request by performing a special operation indicating the desired request using pushbutton digits, or means for inputting a desired request by operating function keys provided on the extension telephone, or erasing means for erasing the contents of speech recorded on the recording unit. The erasing means includes means for erasing the contents of speech recorded after a specific period of time has elapsed.

Each of the extension telephones further includes display means for displaying the present using states including the recording, wait, and reproducing states. The display means includes at least either means for indicating the using states by color changes of an indicator or means for indicating the using states by characters on a liquid-crystal unit.

The recording control management means includes: recording request storage means for storing the recording request in such a manner that the request corresponds to the extension telephone which has issued the request when the recording request is informed from the extension telephone; and recording control means for recording speech transmitted and received by the extension telephone on the recording unit in such a manner that the speech corresponds to the extension telephone, either when the extension telephone responds to the terminating call to the extension telephone whose recording request is stored in the recording request storage means, or when a receiver responds to the originating call from the extension telephone. Furthermore, the recording control management means includes: reproducing control means for reproducing the recorded speech related to the relevant extension telephone from the recording unit according to the reproducing request and sending the reproduced speech to the extension telephone which has issued the reproducing request when the reproducing request is informed from the extension telephone. The reproducing control means includes means for reproducing the recorded speech as many times as needed, or reproduces the contents of recording because of at least one of a reproducing request from an extension telephone other than the extension telephone related to the recording, the verifying of the contents by more than one extension telephone, and in-house broadcasting, by using a specific password.

The electronic private branch exchange further includes a management table for managing speech recording. The management table includes: a recording request management table used for managing the presence and absence of recording requests for the individual extension numbers; and a recording finish management table used for managing whether or not recording is finished for the individual extension numbers. Additionally, the electronic private branch exchange further includes: a recording time management table used for managing the remaining recording time for each extension number; a basic recording table for storing the recording time for each extension number; and an extra recording time table for storing times to be added to the recording time management table according to the user's recording time addition request. The recording time management table includes means for managing the recording time of at lest one call.

The electronic private branch exchange includes means for making an absence response when there is no response from the extension telephone after a certain period of time has elapsed since the arrival of a terminating call.

With the present invention, a recording request is made from an extension telephone and stored in an electronic private branch exchange. Because a recording unit is started when the extension telephone that made the recording request has made a terminating call response, speech transmitted and received by the extension telephone never fails to be recorded immediately after the terminating call response. Therefore, it is possible to record all of the self-introduction and conversation with the other party immediately after the start of the call. Because the user need not operate to specify recording while talking, a troublesome operation during conversation can be eliminated.

With the invention, each extension telephone includes request input means for inputting desired requests including requests for recording and reproducing speech related to its own call, and request informing means for informing the electronic private branch exchange of the contents of the request inputted from the request input means. The electronic private branch exchange includes reproducing and recording control means for providing control of the recording unit according to the contents of the request, the control including the recording and reproducing of the contents of conversation, when the request is informed by at least one of the extension telephones. When a terminating call occurs to the extension telephone that has issued the recording request which is stored in recording request storage means, and the extension telephone responds to the terminating call, a recording management control means records speech transmitted and received by the extension telephone on the recording unit in such a manner that the speech corresponds to the extension telephone. In addition, when the reproducing request is informed from the extension telephone, the recording management control means reproduces the recorded speech related to the relevant extension telephone from the recording unit according to the reproducing request and sends the reproduced speech to the extension telephone which has issued the reproducing request.

With the invention, it is possible to provide an electronic private branch exchange system with a message recording function capable of recording all of the conversation over the extension telephone immediately after the terminating call response, thereby assuring the recording of the important telephone conversation and the self-introduction generally made immediately after the start of the call.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Figure 1:
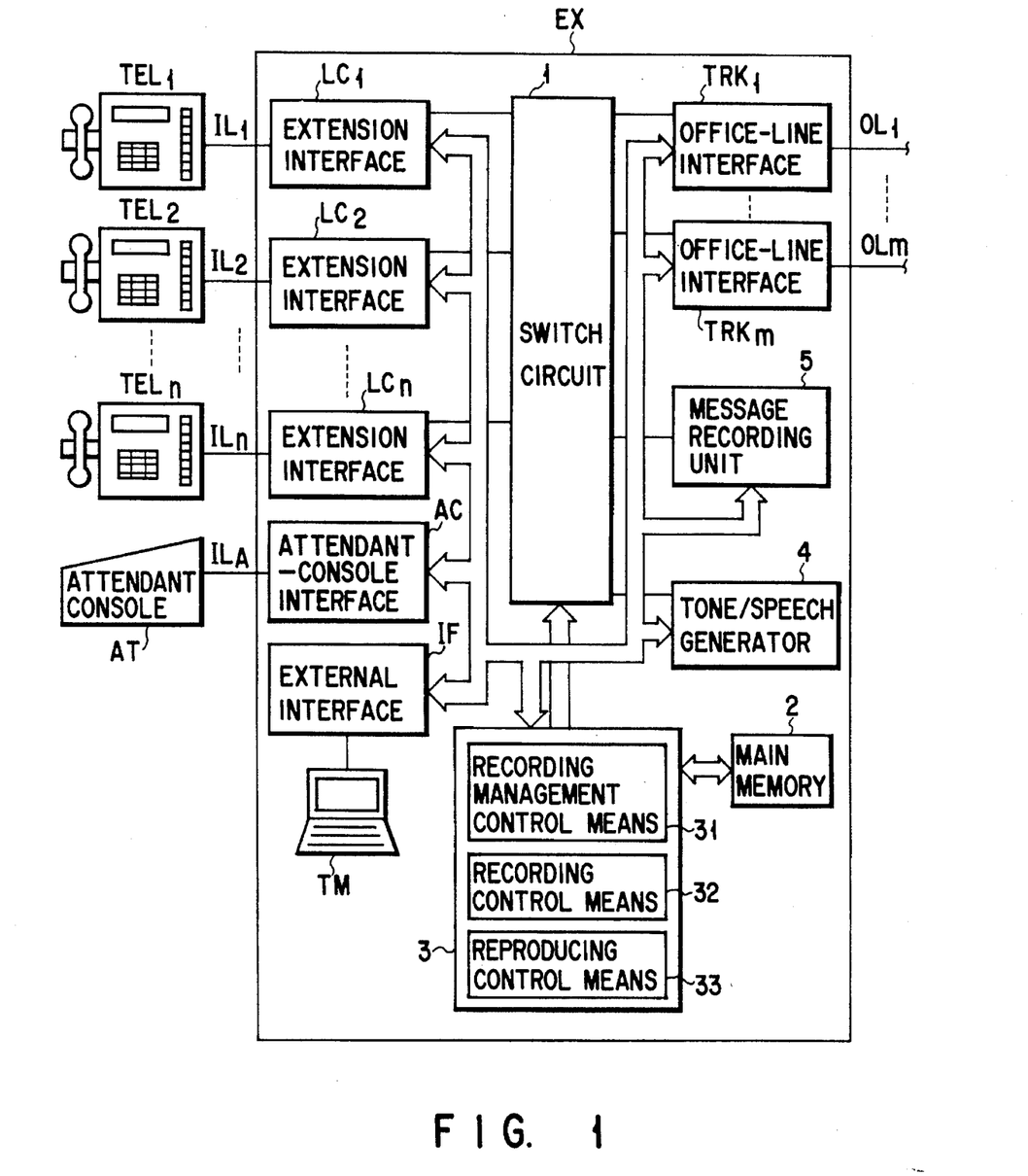
FIG. 1 is a block diagram of an electronic private branch exchange system according to an embodiment of the present invention.

FIG. 1 is a block diagram of an electronic private branch exchange system according to an embodiment of the present invention. In FIG. 1, the electronic private branch exchange system includes a plurality of extension telephones $TEL_1$ to $TEL_n$ and an electronic private branch exchange EX.

Figure 2:
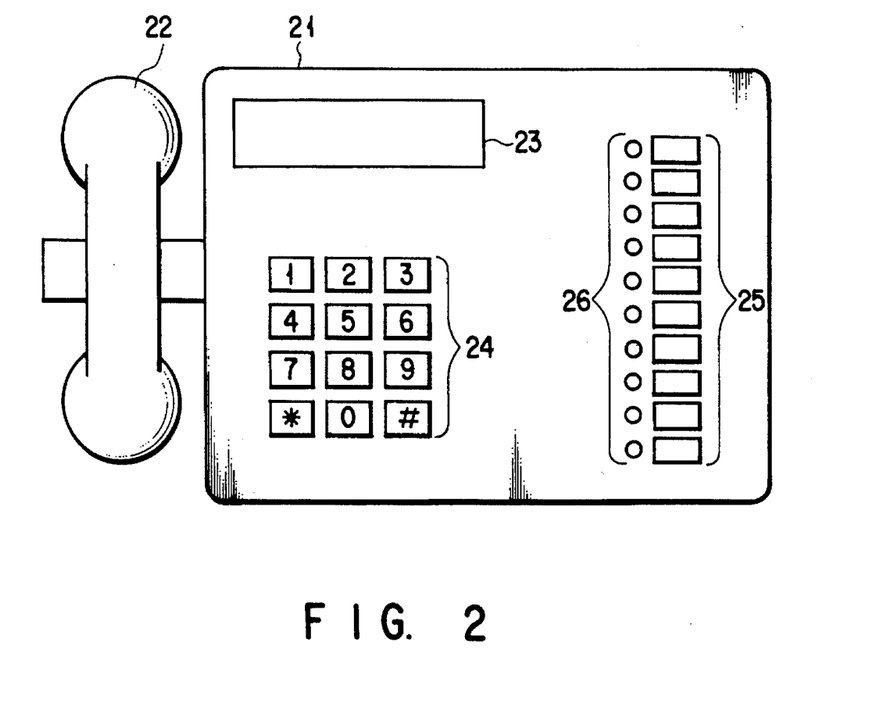
FIG. 2 is a schematic arrangement of the operation panel section of an extension telephone.

Each of the extension telephones $TEL_1$ to $TEL_n$ is composed of an electronic multifunctional telephone as shown in FIG. 2, for example. FIG. 2 is a schematic arrangement of the operation panel section of an extension telephone. An extension telephone TEL (hereinafter, extension telephone TEL is used as the representative of the extension telephones) includes an operation panel 21 and a handset 22. The operation panel 21 comprises a liquid crystal indicator (LCD) 23, pushbutton digits 24, a plurality of function keys 25, indicator lamps 26 made up of light-emitting diodes (LED) provided so as to correspond to the function keys 25. The function keys 25 include an automatic recording key and an erasing key. The automatic recording key is used to request the electronic private branch exchange EX to record the speech signal related to its own call and also to require the reproduction of the recorded speech signal. The erasing key is used to erase the recorded speech signal. The handset 22 houses a speaker for reception and a microphone for transmission.

Figure 3:
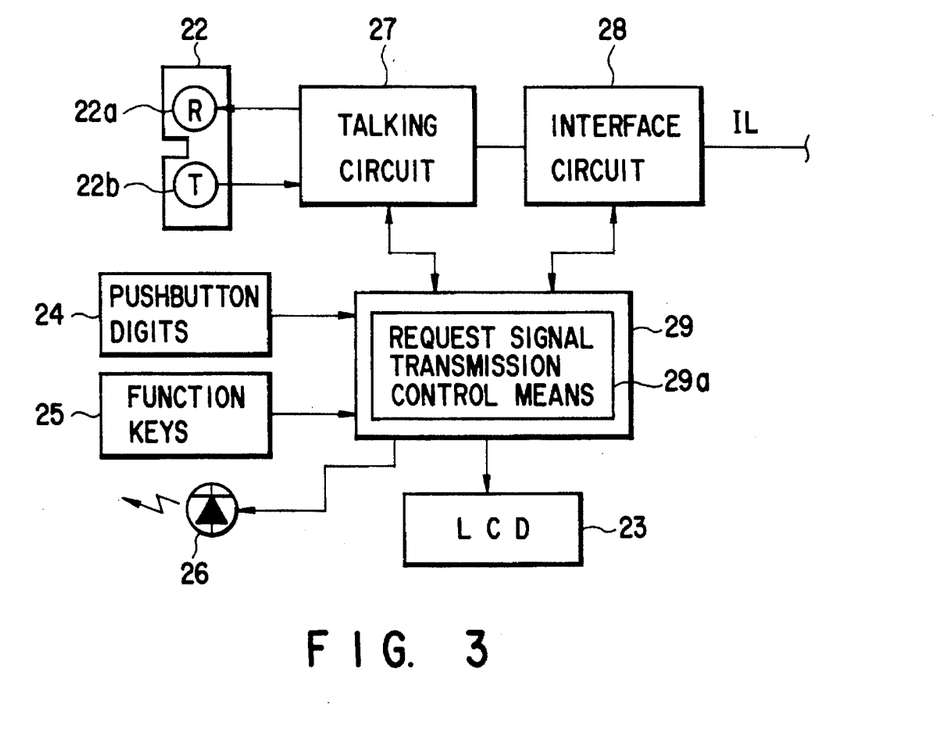
FIG. 3 is a block diagram of an extension telephone.

FIG. 3 is a block diagram of extension telephone TEL.

The incoming speech signal via an extension IL passes through an interface circuit 28 and enters a talking circuit 27. The talking circuit 27 performs two-wire/four-wire conversion of the speech signal, amplifies the resulting signal, and outputs the amplified signal at a speaker 22a of the handset 22. After the transmission speech signal inputted to a microphone 22b undergoes four-wire/two-wire conversion at the talking circuit 27, the converted signal is sent to the extension IL via the interface circuit 28. The interface circuit 28 senses a terminating call signal coming from the electronic private branch exchange EX via the extension IL, acquires extension IL for call originating, transmits a dial signal, etc.

The extension telephone TEL of the invention is provided with, for example, a control circuit 29 using a microcomputer as the main control section. The control circuit 29 includes request signal transmission control means 29a for requesting the recording and reproducing of speech in addition to ordinary control functions associated with originating and terminating calls and telephone conversation. When the automatic recording key of the function keys 25 is pressed, the request signal transmission control means 29a generates the following various signals according to the situation, and transmits the generated signal to the electronic private branch exchange EX via the interface circuit:

(1) In the wait state (or the on-hook state): a recording request signal (2) During reception of dial tone in the off-hook state: a reproducing request signal (3) During conversation: a recording time extension request signal During reception of the dial tone, when the erasing key of the function keys 25 is pressed, an erasing request signal is sent to the electronic private branch exchange EC via the interface circuit 28.

The LCD 23 displays the time in the wait state and the other party's telephone number and the duration of talking in the busy state.

The indicator lamps 26 are provided so as to correspond to the function keys. When a key is pressed, the corresponding light comes on and stays on as long as the key is latched in the pressed state. For instance, the indicator lamps 26 represent the recording operation, the wait state, and the reproducing operation in different colors.

The LCD 23 and indicator lamps 26 are not necessarily required, either of them has only to be needed to check the operation at the present time.

The electronic private branch exchange EX comprises a plurality of extension interface circuits $LC_1$ to $LC_n$, a plurality of office-line interface circuits $TRK_1$ to $TRK_m$, an attendant-console interface circuit AC, and an external interface circuit IF. The electronic private branch exchange EX further comprises a switch circuit 1, a main memory section 2, a central control circuit 3, a tone/speech generator circuit 4, and a message recording unit 5.

Connected via extensions $IL_1$ to $IL_n$ to the extension interface circuits $LC_1$ to $LC_n$ are extension telephones $TEL_1$ to $TEL_n$ as extension terminals.

The extension interface circuits $LC_1$ to $LC_n$ are connected to the corresponding extension telephones $TEL_1$ to $TEL_n$, and perform various interface operations on the extension telephones $TEL_1$ to $TEL_n$, the operations including the sensing of the originating call signal and dial signal and the transmitting of the terminating call signal, dial tone, etc.

The office-line interface circuits $TRK_1$ to $TRK_m$ are connected to a public telecommunication network (not shown) via office lines $OL_1$ to $OL_m$. The office-line interface circuits $TRK_1$ to $TRK_m$ exchange various control signals related to originating and terminating connection with the public telecommunication network via office lines $OL_1$ to $OL_m$.

The attendant-console interface circuit AC is connected to an attendant console AT via an attendant-console extension ILA and interfaces with the console AT.

The attendant console is used for the operator to carry out manual switching.

To the external interface circuit IF, a maintenance terminal unit TM is connected.

The maintenance terminal unit TM is used to change various control programs and operating data used in the central control circuit 3, which will be explained later in detail.

The switch circuit 1, according to the instruction from the central control circuit 3, switches between the extension interface circuits $LC_1$ to $LC_n$ and between extension interface circuits $LC_1$ to $LC_n$ and office-line interface circuits $TRK_1$ to $TRK_m$. The switch circuit 1 connects the tone/speech generator circuit 4 and the message recording unit 5 to the extension interface circuits $LC_1$ to $LC_n$ as the need arises.

The main memory section 2 is, for example, made up of a RAM and includes a memory for storing various processing programs and operating data used in the central control circuit 3. The main memory section 2 further includes a recording request flag table M11, a recording finish table M12, a recording timer table M2, a basic recording time memory M31, and an extra recording time memory M32 as memories used for recording control of speech, reproducing control, and their management. The detailed contents of the recording request flag table M11, recording finish table M12, recording timer table M2, basic recording time memory M31, and extra recording time memory M32 are shown in FIGS. 4 to 6.

Figure 4:
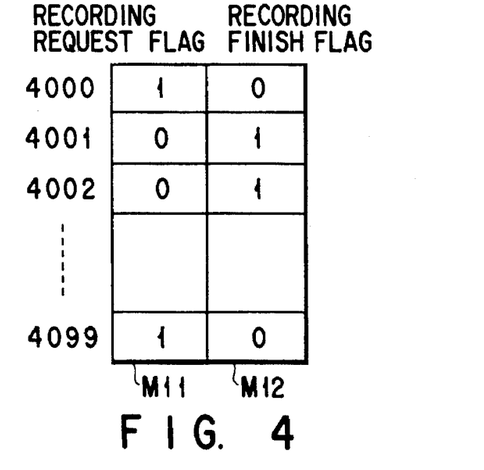
FIG. 4 shows the structure of a recording request flag table and a recording finish flag table.

FIG. 4 shows the structure of the recording request flag table M11 and recording finish table M12.

The recording request flag table M11 stores recording request flags according to extension numbers. The recording request flag becomes "1", for example, when a recording request signal has arrived from an extension telephone in the wait state. The recording finish table M12 stores recording finish flags according to extension numbers. The recording finish flag becomes "1", for example, when speech related to the call on the corresponding extension telephone is recorded on the message recording unit 5.

Figure 5:
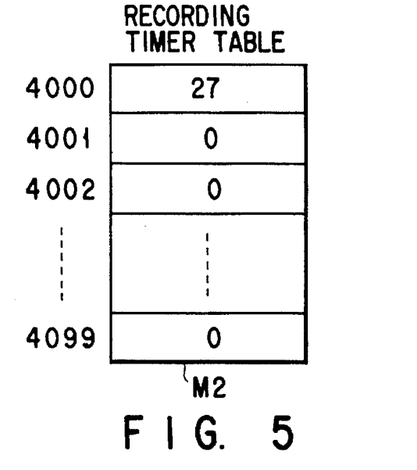
FIG. 5 shows the structure of a recording timer table.
Figure 6:
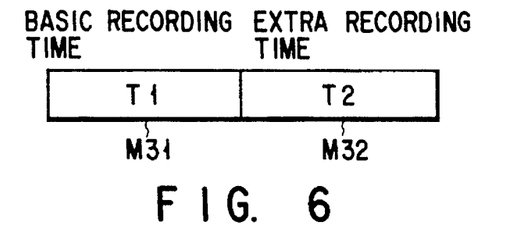
FIG. 6 illustrates a basic recording time memory and an extra recording time memory.

FIG. 5 shows the structure of the recording timer table M2. FIG. 6 shows the basic recording time memory M31 and extra recording time memory M32.

The recording timer table M2 is used to count the remaining recording time for each extension number during a recording operation. The counting of the remaining recording time is effected by a software timer.

The basic recording time memory M31 stores specific basic recording time data T1. The basic recording time data T1 is set in the corresponding extension number area in the recording timer table M2 at the start of the recording operation. The extra recording time memory M32 stores specific extra recording time data T2. The extra recording time data T2 is added to the remaining recording time data in the corresponding extension number area in the recording timer table M2 according to the user's recording time addition request.

The central control circuit 3 includes recording management control means 31, recording control means 32, and reproducing control means 33, and provides overall control of message recording. The recording management control means 31 provides overall control of recording, reproducing, and erasing operations. The recording control means 32 controls the recording of speech on the message recording unit 5. The reproducing control means 33 reproduces the contents of speech stored in the message recording unit 5.

The tone/speech generator circuit 4, according to the instruction from the central control circuit 3, produces tone signals including the dial tone, the service dial tone, the busy tone, and the reorder tone, and sends these tone signals to the individual extension telephones $TEL_1$ to $TEL_n$.

Figure 7A:
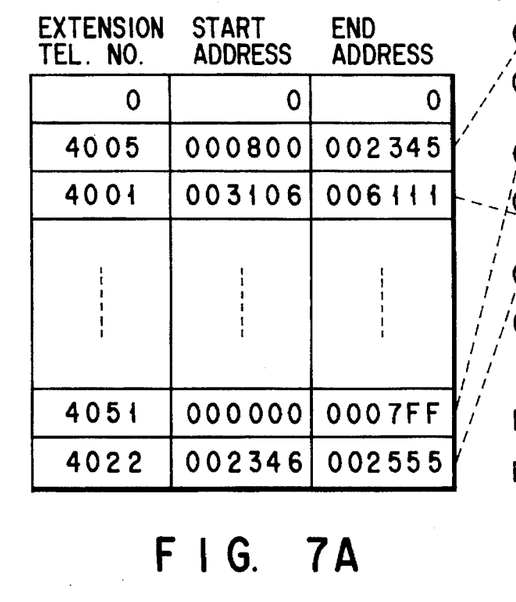
FIGS. 7A and 7B show the memory structure and an example of its use.

The message recording unit 5 is made up of, for example, a semiconductor memory, and converts the speech signal into a PCM signal and stores it. The message recording unit 5 stores a memory area for the speech signal and a recording management table. The recording management table stores the extension telephone number, and the record start address and end address each time the speech signal is recorded as shown in FIG. 7A, for example.

The operation of recording, reproducing, and erasing speech in the system constructed as described above will be explained.

A case where speech is recorded on the electronic private branch exchange EX will be described.

The user of one of the extension telephones $TEL_1$ to $TEL_n$ presses the automatic recording key in the on-hook state. The extension telephone whose automatic recording key has been pressed (in this embodiment, it is assumed that extension telephone $TEL_1$ is pressed) sends a recording request signal to the electronic private branch exchange EX. When the recording request signal has arrived from the extension telephone $TEL_1$, the central control circuit 3 of the electronic private branch exchange EX registers the automatic recording request by setting "1" in the area (e.g., the first area "4000") corresponding to the relevant extension number in the recording request flag table M11 in the main memory section 2.

When a terminating call signal has arrived via extension OL at the extension telephone $TEL_1$ whose automatic recording request is registered, the central control circuit 3 of the electronic private branch exchange EX transfers the terminating call signal from the corresponding extension interface circuit $LC_1$ to the extension telephone $TEL_1$, and monitors the terminating call response from the extension telephone $TEL_1$. When sensing the terminating call response, the central control circuit 3 executes the following recording control, and then causes the switch circuit 1 to connect the extension telephone $TEL_1$ to the terminating office line to start the busy state.

Figure 8:
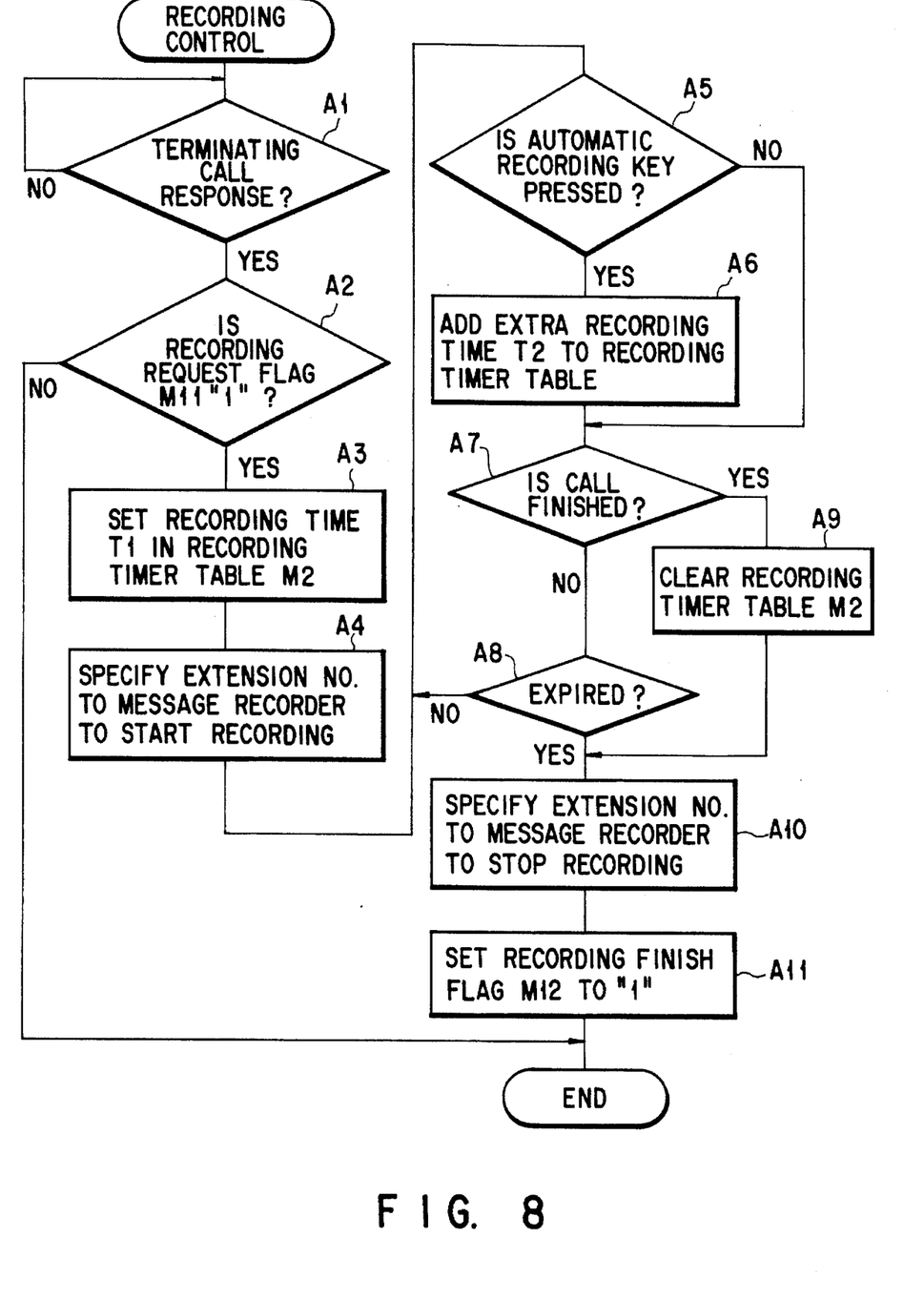
FIG. 8 is a flowchart for the recording control operation.
Figure 9:
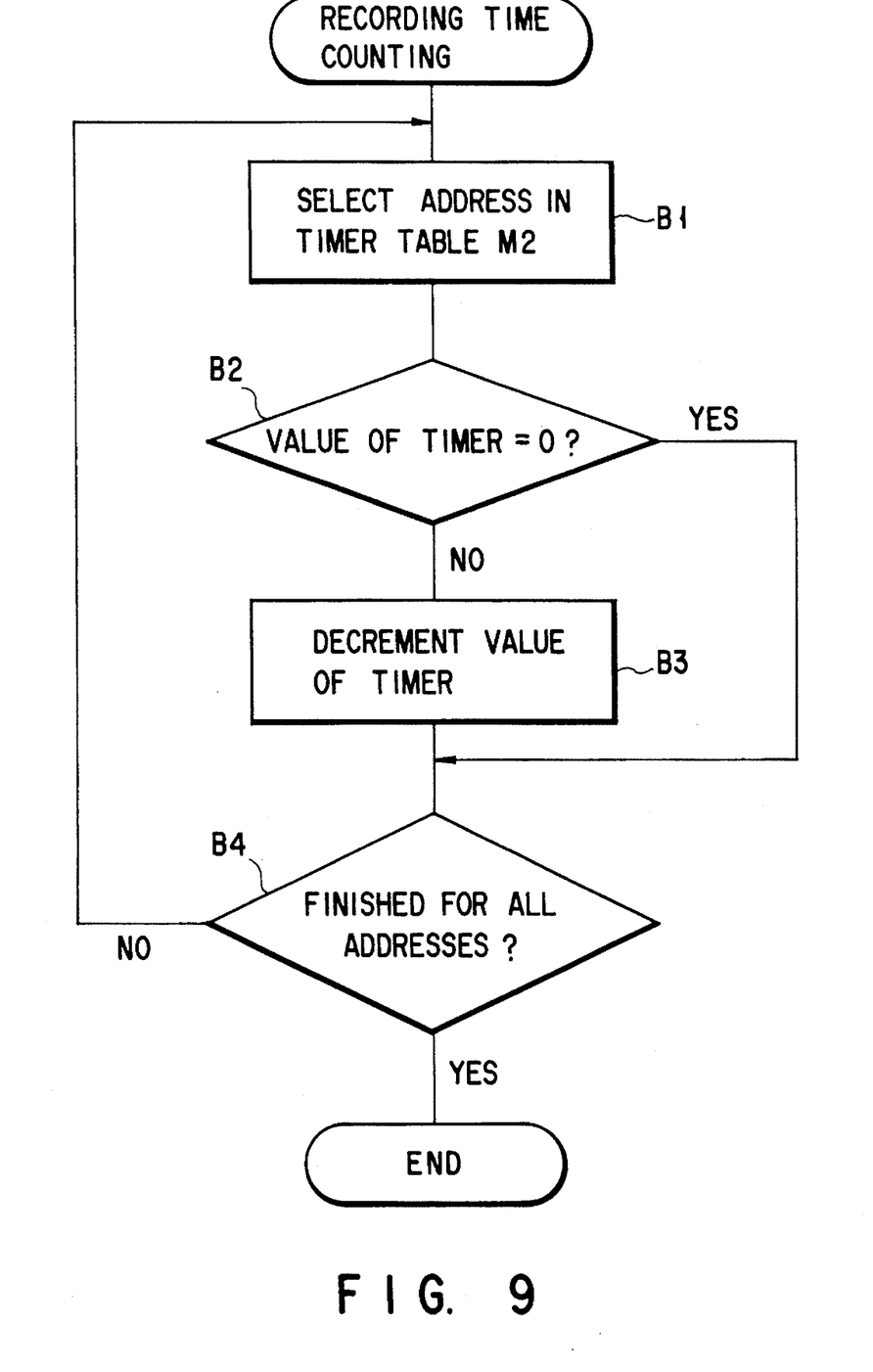
FIG. 9 is a flowchart for the counting operation of recording time.

A detailed operation of recording control will be described with reference to FIGS. 8 and 9. FIG. 8 is a flowchart for the recording control operation. FIG. 9 is a flowchart for the counting operation of recording time.

When sensing a terminating call response (step A1), the central control circuit 3 judges whether or not the recording request flag M11 for the corresponding extension is "1" (i.e., whether or not an automatic recording request has been registered) (step A2).

If the recording request flag M11 is "1", the central control circuit 3 will read basic recording time data T1 from the basic recording time memory M31 and set it in the corresponding extension telephone area in the recording timer table M2 and thereby bring the software timer into an operating state (step A3). The software timer is actuated each time an interrupt is generated by a hardware timer (not shown) at 1-sec intervals.

The subtracting process of the remaining recording time at the software timer will be described with reference to FIG. 9. The central control circuit 3 selects an extension number address in the recording timer table M2 (step B1) and checks to see if the remaining recording time data stored at the extension address is "0" (step B2). If it is not "0," control goes to the step B3, where the remaining recording time data is decremented by "1" every second (step B3). The above control is carried out for all the extension number addresses whose remaining recording time data is "1" or more (step B4).

The central control circuit 3 specifies the extension telephone number to the message recording unit 5 and causes the unit to start recording (step A4). After the recording operation has started, the switch circuit 1 connects extension telephone $TEL_1$ to the terminating office line to make it possible to talk over the telephone, and at the same time, connects the message recording unit 5 to the connected talking path. With this connection, the message recording unit 5 starts to record the speech transmitted from and received by the extension telephone $TEL_1$ at the beginning of the talking.

During conversation over the extension telephone $TEL_1$, the central control circuit 3 monitors whether or not the automatic recording key is pressed on extension telephone $TEL_1$ (step A5), whether or not the call is finished (step A7), and whether or not the remaining recording time has expired (step A8).

At step A5, if the user presses the automatic recording key on extension telephone $TEL_1$, the telephone $TEL_1$ sends a recording time extension request signal to the electronic private branch exchange EX. When having received the recording time extension request signal, the central control circuit 3 of the electronic private branch exchange EX reads extra recording time data T2 from the extra recording time memory M32, and adds the extra recording time data T2 to the remaining recording time data at extension number address "4000" corresponding to extension telephone $TEL_1$ in the recording timer table M2 (step A6).

When the call on the extension telephone $TEL_1$ ends during the recording, the central control circuit 3 clears to zero the remaining recording time data at the address in the recording timer table M2 (step A9). Then, the circuit 3 specifies the extension number to the message recording unit 5 and causes the unit to stop recording (step A10). In this case, more than one talk may be recorded in the range of basic recording time T1 without clearing the remaining recording time to zero. In this case, although the operation shown in FIG. 9 is partially changed, the explanation is omitted.

A flag "1" indicating that recording is finished is set in area "4000" corresponding the extension telephone $TEL_1$ the recording finish table M12 (step A11). After the recording is completed, the flag at the extension number address "4000" corresponding to the extension telephone $TEL_1$ in the recording request flag table M11 is reset to "0."

When the recording goes on during conversation and the remaining recording time at extension number address "4000" corresponding to extension telephone $TEL_1$ becomes "0" (step A8), the central control circuit 3 specifies the extension number to the message recording unit 5 and causes the unit to stop the recording operation (step A10). The flag at extension address "4000" corresponding to the extension telephone in the recording finish table M12 is set to "1" indicating that recording is finished (step A11).

Figure 7B:
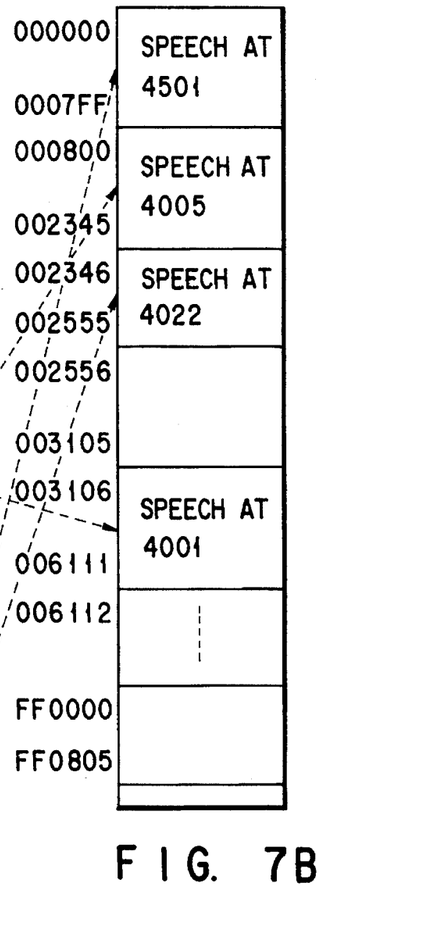

In this way, the automatic recording of the speech signal by the extension telephone $TEL_1$ is completed. When in the wait state, a terminating call takes place at another extension telephone whose automatic recording request has been registered previously, and the user has responded to the terminating call, the speech is automatically recorded on the message recording unit 5 in the same manner as the extension telephone $TEL_1$. FIG. 7B shows an example of the state of thus recorded speech for each extension telephone. FIG. 7A shows an example of the management data for the recorded state.

Figure 10:
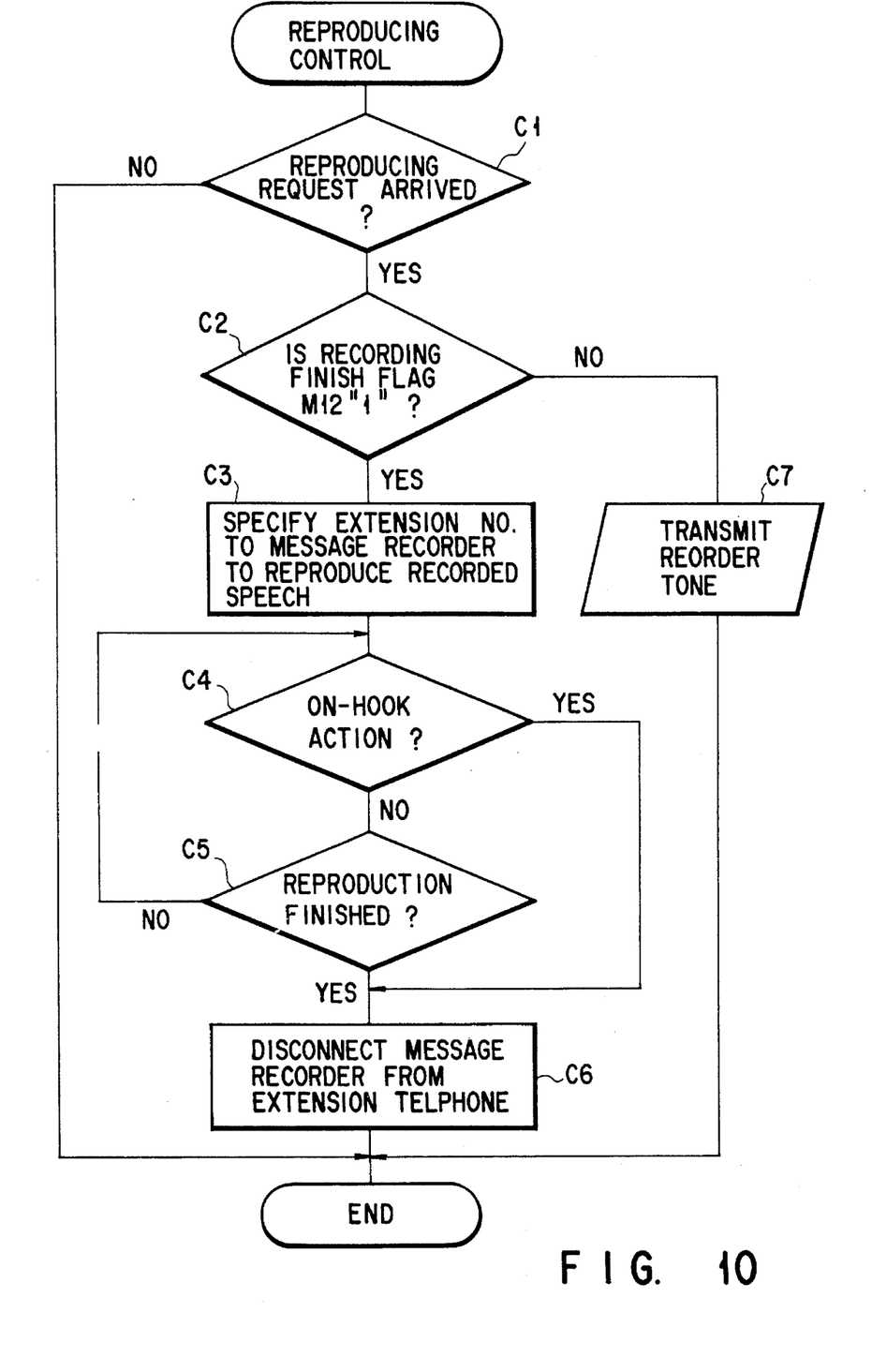
FIG. 10 is a flowchart for the reproducing control operation.

Referring to FIG. 10, the reproduction of the speech recorded on the message recording unit 5 will be explained. FIG. 10 is a flowchart of the reproducing control operation.

The user of the extension telephone $TEL_1$ picks up the telephone, makes sure of the dial tone, and then presses the automatic recording key. The control circuit 29 of the extension telephone $TEL_1$ generates a reproducing request signal and sends it to the electronic private branch exchange EX.

When sensing the arrival of the reproducing request signal from the extension telephone $TEL_1$ (step C1), the central control circuit 3 of the electronic private branch exchange EX judges whether or not the flag at extension address "4000" corresponding to extension telephone $TEL_1$ in the recording finish table M12 is "1" indicating that recording is finished (i.e., whether or not speech is recorded) (step C2).

At step C2, if no speech is recorded (i.e., the flag is "0"), the central control circuit 3 drives the tone/speech generator circuit 4 to produce a reorder tone and send it to the extension telephone $TEL_1$ (step C7), which completes the operation.

At step C2, if speech is recorded (i.e., the flag is "1"), the central control circuit 3 specifies the extension number to the message recording unit 5 and causes the unit to start reproducing (step C3). At this time, the message recording unit 5 accesses the memory on the basis of the specified extension number and the contents of the recording management table, and reproduces the speech over extension telephone $TEL_1$ and outputs it. The speech signal is converted back into an analog signal, which is then sent to the extension telephone $TEL_1$ via the switch circuit 1 and the extension interface circuit $LC_1$.

During reproduction, the central control circuit 3 monitors the on-hook operation of the extension telephone $TEL_1$ (step C4) and the ending of the reproduction (step C5). If an off-hook operation is effected at extension telephone $TEL_1$ (step C4) or the reproducing of the recorded speech has finished (step C5), the central control circuit 3 stops the operation of the message recording unit 5, disconnects the talking path between the message recording unit 5 and the extension telephone $TEL_1$, and brings the unit into the wait state (step C6).

The reproducing of speech can be repeated as many times as needed until the speech is erased from the message recording unit 5.

Figure 11:
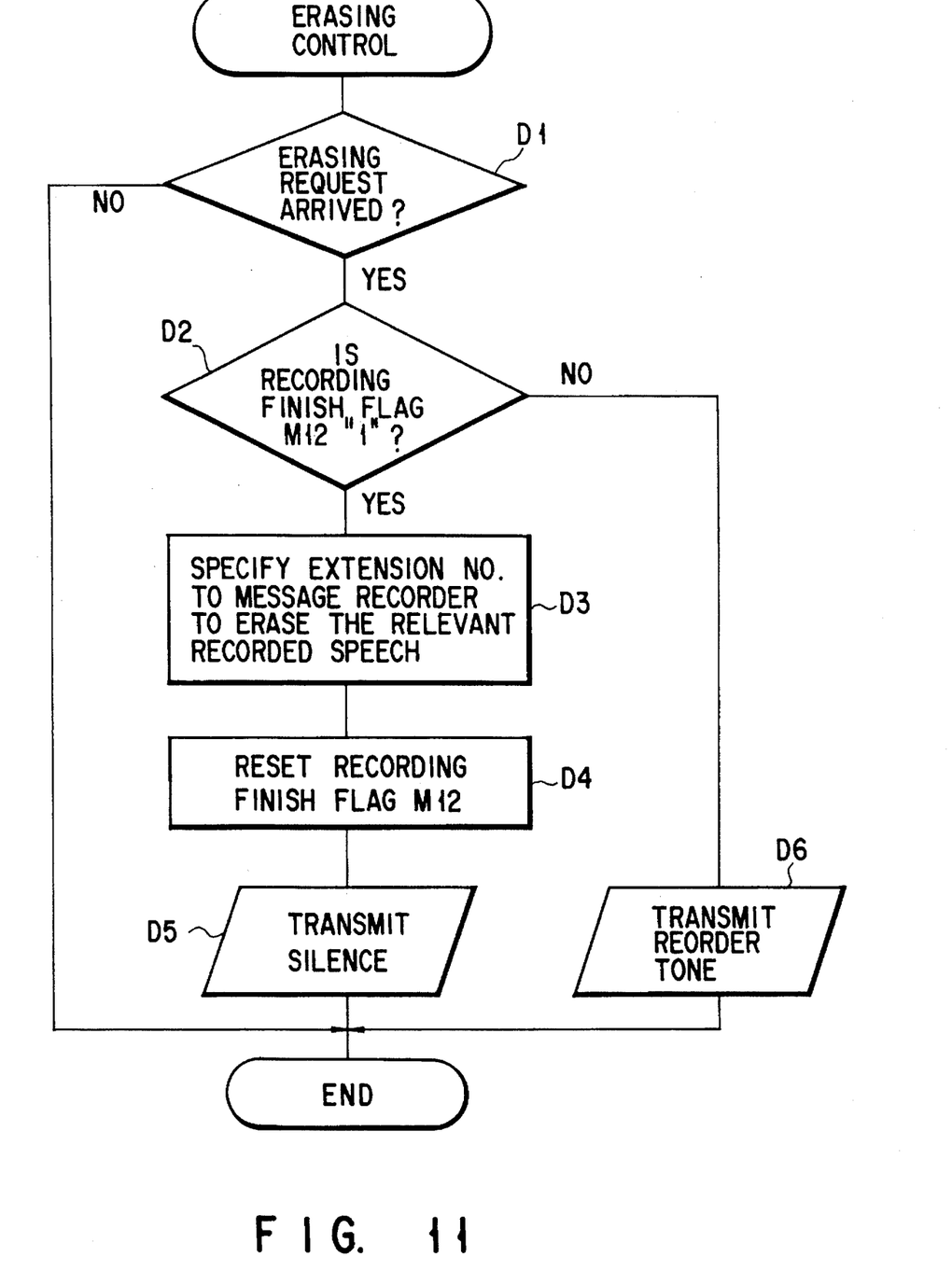
FIG. 11 is a flowchart for the erasing control procedure and the contents of the erasing control.

The operation effected when the speech recorded on the message recording unit 5 become unnecessary and is to be erased will be explained with reference to FIG. 11.

When the user picks up the extension telephone $TEL_1$, makes sure of the dial tone, and then presses the erasing key, the extension telephone $TEL_1$ sends an erasing request signal to the electronic private branch exchange EX.

When sensing the arrival of the erasing request signal (step D1), the central control circuit 3 of the electronic private branch exchange EX judges whether or not the flag at extension address "4000" corresponding to extension telephone $TEL_1$ in the recording finish table M12 is "1" indicating that recording is finished (i.e., whether or not speech is recorded) (step D2).

At step D2, if no speech is recorded (i.e., the flag is "0"), the central control circuit 3 drives the tone/speech generator circuit 4 to produce a reorder tone and send it to the extension telephone $TEL_1$ (step D6), which completes the operation.

At step D2, if speech is recorded (i.e., the flag is "1"), the central control circuit 3 specifies the extension number to the message recording unit 5 and causes the unit to erase the speech data recorded in the corresponding area (step D3). The central control circuit 3 specifies the extension number to the message recording unit 5, resets the corresponding flag in the recording finish table M12 to "0," and sends silence to extension telephone $TEL_1$ (step D5). On the basis of the silence, the user of the extension telephone $TEL_1$ makes sure that the speech has been erased.

As described above, with the present invention, when the automatic recording key is pressed with the extension telephones $TEL_1$ to $TEL_n$ in the wait state, a recording request is stored in the recording request flag table M11 in the electronic private branch exchange EX. A terminating call takes place for the extension telephones $TEL_1$ to $TEL_n$ that have requested recording. When the extension telephones $TEL_1$ to $TEL_n$ respond to this, the message recording unit 5 in the electronic private branch exchange EX is driven to record the speech signal on the extension telephones $TEL_1$ to $TEL_n$.

Accordingly, with the invention, the conversations over the extension telephones $TEL_1$ to $TEL_n$ never fail to be recorded on the message recording unit 5 from the start of talking. Because the user does not need to operate to specify recording while talking, this eliminates trouble in operation. Since a record specifying operation during conversation is eliminated, this can prevent the disadvantages that the important messages from the other party fails to be recorded during the record specifying operation and that the other party's name and company name given just after the terminating call response fail to be recorded.

Additionally, with the invention, since it is easy to specify the recording, reproducing, etc. of speech from extension telephones, and the user of a telephone can selectively record only the desired speech, this prevents wasteful speech from being recorded.

The present invention is not limited to the above embodiment.

In the above embodiment, multifunctional telephones are used as extension telephones, and by using their function keys, an automatic recording request, a reproducing request, a recording time extension request, or an erasing request is sent to an electronic private branch exchange EX. When ordinary telephones without function keys are used as extension telephones, the desired request may be sent to the electronic private branch exchange EX by performing a special operation to indicate the desired request using the pushbutton digits.

While in the above embodiment, the recording of speech on the terminating call has been explained, speech transmitted from an extension telephone may be recorded. In this case, speech has only to start to be recorded at the time when the telephone is connected to the receiver.

While in the embodiment, the recording of speech on a single extension telephone has been explained, conversations over more than one extension telephone may be recorded simultaneously as a different speech with each other.

Although in the embodiment, only the extension telephone number, the start and end addresses of speech are recorded on the message recording unit 5, such data as the start time of speech may be recorded in addition to those items. By doing this, the retrieval of the contents of speech becomes easier.

While in the embodiment, only the extension telephone which has made a speech recording request can reproduce the recorded speech and allow the user to listen to it, another extension telephone may reproduce the recorded speech and allow the user to listen to it. In this case, the user intending to listening enters his password together with a reproducing request. The electronic private branch exchange EX collates the entered password with a previously stored password and, when both passwords coincide with each other, effects a reproducing operation. By doing this, it is possible to make sure of the contents of speech on the desired extension telephone while guarding the privacy of recorded telephone conversations. Additionally, more than one user may listen to the recorded conversations at more than one extension telephone by using their passwords. The recorded conversations may be broadcast within the office only.

While in the embodiment, the basic recording time T1 is set for each extension telephone and an extra recording time data T2 is used to make the recording time longer for a conversation lasting beyond T1, the contents of conversation may be recorded as long as the memory permits without particularly setting a recording time.

Although in the embodiment, the recorded speech is stored until the user carries out an erasing operation, it may be erased automatically after a certain period of time (e.g., a day) has elapsed.

While in the embodiment, automatic recording control is executed only when an extension telephone has made a terminating call response, the electronic private branch exchange EX may make an absence response when there is no terminating call response from the extension telephone even after a certain period of time has elapsed, for example.

The present invention may be practiced or embodied in still other ways without departing from the spirit or essential character thereof. For instance, modifications may be made on the arrangements of the electronic private branch exchange, extension terminals, message recording unit, the structure of the main memory section, and the control procedures of the recording control means, reproducing control means, and erasing control means and the contents of their control.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic private branch exchange system with a message recording function comprising:

a private branch exchange with at least one office line and a plurality of extensions for selectively switching to provide connections between said office line and respective extensions of said plurality of extensions and to provide connections between respective extensions of said plurality of extensions;

a plurality of extension telephones connected to said extensions; and a recording unit for recording speech transmitted and received by said extension telephones, wherein at least one of said extension telephones includes request input means for inputting requests including requests for recording speech and request informing means for informing said electronic private branch exchange of the contents of said requests inputted from said request input means; and said electronic private branch exchange further comprises recording management control means for controlling said recording unit according to said requests, said recording management control means including means for starting recording at the time a called terminal responds to a call from said central office line, if said request informing means is informed of a request for recording from at least one of said plurality of extension telephones connected by the call.

2. An electronic private branch exchange system according to claim 1, wherein said electronic private branch exchange includes recording means for recording extension numbers and the start and end addresses of the contents of speech on said recording unit.

3. An electronic private branch exchange system according to claim 2, wherein said recording means includes means for recording the start time of speech recording on said recording unit, said start time being a time when recording is started.

4. An electronic private branch exchange system according to claim 1, wherein said request input means includes means for inputting a desired request by performing a special operation indicating the desired request using push-button digits.

5. An electronic private branch exchange system according to claim 1, wherein said request input means includes means for inputting a desired request by operating function keys provided on said extension telephone.

6. An electronic private branch exchange system according to claim 1, wherein said request input means further includes erasing means for erasing the contents of speech recorded on said recording unit.

7. An electronic private branch exchange system according to claim 6, wherein said erasing means includes means for erasing the recorded contents of speech after a specific period of time has elapsed.

8. An electronic private branch exchange system according to claim 1, wherein each of said plurality of extension telephones further includes display means for displaying a current state from among the states consisting of a recording state, a wait state, and a reproducing state.

9. An electronic private branch exchange system according to claim 8, wherein said display means includes at least one of (1) means for indicating the current state by color changes of an indicator and (2) means for indicating the current state by characters on a liquid-crystal unit.

10. An electronic private branch exchange system according to claim 1, wherein said recording management control means includes:

recording request storage means for storing a recording request in such a manner that the request corresponds to one of said plurality of extension telephones which has issued the recording request when said recording request is from said one of said plurality of extension telephones; and recording control means for recording speech transmitted from said one extension telephone to said recording unit in such a manner that the speech corresponds to the connected extension telephones of said plurality of extension telephones, either when the extension telephone is a called terminal responding to a call from the extension telephone whose recording request is stored in said recording request storage means, or when the extension telephone originating a call is the extension telephone whose recording request is stored in said recording request storage means.

11. An electronic private branch exchange system according to claim 10, wherein said recording management control means includes:

reproducing control means for reproducing a recorded speech related to a relevant extension telephone of said plurality of extension telephones from said recording unit according to a reproducing request from said relevant extension telephone and sending the reproduced speech to said relevant extension telephone which has issued said reproducing request when said reproducing request has been received at said reproducing control means.

12. An electronic private branch exchange system according to claim 11, wherein said reproducing control means includes means for reproducing the recorded speech as many times as needed.

13. An electronic private branch exchange system according to claim 11, wherein said reproducing control means reproduces contents of recorded speech by means of at least one of (1) a reproducing request from an extension telephone other than the extension telephone related to the recording, (2) the verifying of the contents by more than one extension telephone, and (3) in-house broadcasting, requiring response using a specific password.

14. An electronic private branch exchange system according to claim 1, wherein said electronic private branch exchange further includes a management table for managing speech recording.

15. An electronic private branch exchange system according to claim 14, wherein said management table includes:

a recording request management table used for managing the presence and absence of recording requests for an individual extension number; and a recording finish management table used for managing whether or not recording is finished for the individual extension numbers.

16. An electronic private branch exchange system according to claim 14, wherein said electronic private branch exchange further includes:

a recording time management table used for managing the remaining recording time for each extension number;

a basic recording table for storing the recording time for each extension number; and an extra recording time table for storing times to be added to said recording time management table according to the user's recording time addition request.

17. An electronic private branch exchange system according to claim 16, wherein said recording time management table includes means for managing the recording time of at lest one call.

18. An electronic private branch exchange system according to claim 1, wherein said electronic private branch exchange includes means for making an absence response when there is no response from the extension telephone after a certain period of time has elapsed since the arrival of a terminating call.

19. An electronic private branch exchange system according to claim 1, wherein said recording management control means includes means for recording the contents of speech at the same time as a response to a call from another extension telephone of said plurality of extension telephones.

20. An electronic private branch exchange system according to claim 1, wherein said recording unit includes means for reproducing recorded speech, each of said request input means includes means for inputting a request for reproducing recorded speech, and said recording control means includes means for controlling said means for reproducing recorded speech.

21. An electronic private branch exchange system according to claim 20, wherein each of said extension telephones further includes display means for displaying a current state from among the states consisting of a recording state, a wait state, and a reproducing state.

22. An electronic private branch exchange system according to claim 21, wherein said display means indicates the current state by at least one of (1) color changes of an indicator and (2) characters on a liquid-crystal unit.

23. An electronic private branch exchange system with a message recording function comprising:

a private branch exchange with at least one central office line and a plurality of extensions for selectively switching to provide connections between said central office line and respective extensions of said plurality of extensions and to provide connections between respective extensions of said plurality of extensions:

extension telephones connected to said extensions; and a recording unit for recording speech transmitted and received by said extension telephones, wherein, at least one of said extension telephones includes request input means for inputting requests including requests for recording speech, and request informing means for informing said electronic private branch exchange of the contents of said desired requests inputted from said request input means, and said electronic private branch exchange further comprises recording management control means for controlling said recording unit according to said requests, said recording control means recording the contents of speech starting at a response of a called extension to a call from another extension telephone of said plurality of extension telephones, when a request is from at least one of the extension telephones connected to said called extension and said another extension telephone.

24. An electronic private branch exchange system according to claim 23, wherein said recording unit includes means for reproducing recorded speech, each of said request input means includes means for inputting a request for reproducing recorded speech, and said recording control means includes means for controlling the means for reproducing recorded speech.

25. An electronic private branch exchange system with a message recording function comprising:

a private branch exchange with at least one central office line and a plurality of extensions and having switching means for making connections including at least one of said extensions, having a management table for managing speech recording, said management table including a recording request management table used for managing the presence and absence of recording requests for individual of extension numbers and a recording finish management table used for managing whether or not recording is finished for the individual of extension numbers;

extension telephones connected to said extensions; and a recording unit for recording and reproducing speech transmitted and received by said extension telephones, wherein, at least one of said extension telephones includes request input means for inputting requests including requests for recording speech, and request informing means for informing said electronic private branch exchange of the contents of said requests inputted from said request input means, and said electronic private branch exchange further comprises recording management control means for controlling said recording unit according to a request when said recording management control means verifies said request as being from said request informing means of at least one of said extension telephones connected by said switching means.

26. An electronic private branch exchange system according to claim 25, wherein said request input means includes means for inputting a request by performing a special operation indicating the request using pushbutton digits.

27. An electronic private branch exchange system according to claim 25, wherein said request input means includes means for inputting a request by operating function keys provided on said extension telephones.

28. An electronic private branch exchange system according to claim 25, wherein said request input means further includes erasing means for erasing the speech recorded on said recording unit.

29. An electronic private branch exchange system according to claim 28, wherein said erasing means includes means for erasing a recorded speech in said recording unit after a specific period of time has elapsed from the recording of said recorded speech in said recording unit.

30. An electronic private branch exchange system according to claim 25, wherein each of said extension telephones further includes display means for displaying a current state from among plural states consisting of a recording state, a wait state, and a reproducing state.

31. An electronic private branch exchange system with a message recording function comprising:

a private branch exchange with at least one central office line and a plurality of extensions for selectively switching to provide connections between said central office line and respective extensions of said plurality of extensions and to provide connections between respective extensions of said plurality of extensions, having a management table for managing speech recording, a recording time management table used for managing a remaining recording time for each extension, a basic recording table for storing a recording time for each extension, and an extra recording time table for storing times to be added to said recording time management table according to a user's recording time addition request;

extension telephones connected to said extensions; and a recording unit for recording and reproducing speech transmitted and received by said extension telephones, wherein, at least one of said extension telephones includes request input means for inputting requests including requests for recording speech, and request informing means for informing said private branch exchange of the contents of said requests inputted from said request input means; and said electronic private branch exchange system further comprises recording management control means for controlling said recording unit according to said requests, said recording control means comprising means for controlling recording and reproducing of the contents of speech, when said request is informed by said request informing means of at least one of said extension telephones connected by the selective switching.

32. An electronic private branch exchange system according to claim 31, wherein said recording time management table includes means for managing the recording time of at least one call.

* * * * *

UNITED STATES PATENT AND TRADEMARK OFFICE
CERTIFICATE OF CORRECTION

PATENT NO. : 5,535,262
DATED : July 09, 1996
INVENTOR(S) : Sinichi KANZAWA

It is certified that error appears in the above-indentified patent and that said Letters Patent is hereby corrected as shown below:

Claim 1, Column 11, Line 60, after "one", insert --central--;

Claim 1, Column 11, Line 62, after "said", insert --central--;

Claim 17, Column 13, Line 58, "lest" should read --least--.

Signed and Sealed this

Seventh Day of January, 1997

Attest:

BRUCE LEHMAN

*Attesting Officer*      *Commissioner of Patents and Trademarks*